United States Patent

Naugle et al.

[15] 3,646,679
[45] Mar. 7, 1972

[54] TOOTH EXTRACTING INSTRUMENT

[72] Inventors: Gene O. Naugle, 1360 Mears Drive; Billie R. Harding, 721 Powers Boulevard, both of Colorado Springs, Colo. 80915

[22] Filed: Mar. 10, 1971

[21] Appl. No.: 122,901

[52] U.S. Cl. .................................................. 32/47
[51] Int. Cl. ................................................. A61c 3/02
[58] Field of Search ...................................... 32/47

[56] References Cited

UNITED STATES PATENTS 599,586  1898  Beede et al. ............................. 32/47

*Primary Examiner*—Robert Peshock
*Attorney*—Reilly and Lewis

[57] ABSTRACT

A hand-held instrument suitable for removing a wolf tooth from the upper jaw of a horse includes an elongated shank having a handle mounted on the rear end and provided with an extractor heat at the other forward end. The extractor head is preferably inclined at an angle to the axis of the shank to afford better leverage in prying and has a unique configuration terminating in a forward beveled cutting edge which permits the head to be slid between the wolf tooth and an adjacent tooth to loosen the root and pry the wolf tooth loose by applying a force to the handle outside the mouth of the animal with only two positions for the extractor head relative to the wolf tooth.

10 Claims, No Drawings

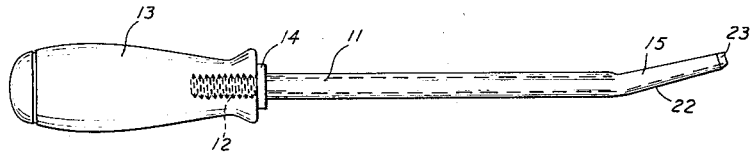

PATENTED MAR 7 1972 3,646,679

INVENTORS
GENE O. NAUGLE
BILLIE R. HARDING
BY
Reilly and Lewis
ATTORNEYS

TOOTH EXTRACTING INSTRUMENT

BACKGROUND OF THE INVENTION

This invention relates to tooth extractors and more particularly to a novel tooth extractor which is highly effective in removing the first premolar or wolf tooth from the upper jaw of a horse.

Usually horses have a first premolar tooth commonly referred to as a wolf tooth. This tooth frequently becomes irritated through the use of a bridle bit or the like and must be removed. Heretofore these premolar teeth have been removed in a variety of ways but no extracting instrument is presently available to remove a wolf tooth in an efficient way as that provided by the present invention.

SUMMARY

Accordingly, it is an object of the present invention to provide a tooth extracting instrument specifically suited for extracting the first premolar or wolf tooth from a horse wherein the instrument is relatively easy to manipulate and maneuver with the hands of the operator away from the mouth of the horse.

Another object of this invention is to provide a tooth extracting instrument in which the complete root can be elevated and the tooth removed with only two positions for the instrument.

Yet a further object of this invention is to provide a tooth extracting instrument having an extractor head on the end of an elongated shank which is generally characterized by an open hollow inner face, preferably semicircular, terminating in a forward cutting edge for first elevating the periosteum away from the root and then prying against the tooth using an adjacent tooth for support.

In accordance with the present invention in a preferred embodiment shown there is provided an extractor head of a unique configuration on the end of an elongated shank, the head having an open hollow inner face, preferably semicircular, and an outer face corresponding in shape to the inner face for slidable insertion about the wolf tooth between the wolf tooth and the second premolar tooth. The extractor head terminates in a forward cutting edge which elevates and loosens the root of the tooth so that it can be extracted by a prying action with the outer face being forced against the second premolar in a prying action to extract the tooth from the upper jaw.

Other objects, advantages and features of the present invention will become more apparent as the description proceeds taken in conjunction with the accompanying drawings, in which:

Figure 1:
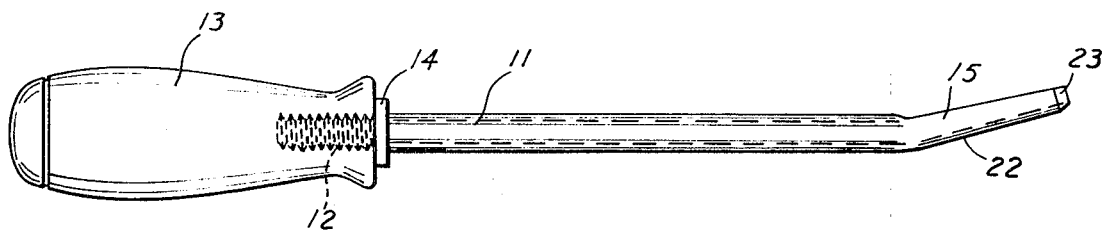
FIG. 1 is a side elevation view of a tooth extracting instrument.
Figure 2:
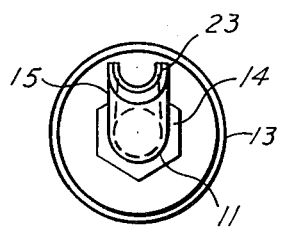
FIG. 2 is a front end elevation view of a tooth extracting instrument shown in FIG. 1.
Figure 3:
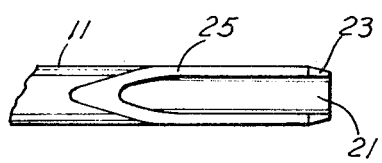
FIG. 3 is a top plan view of the extractor head of the instrument shown in FIGS. 1 and 2.
Figure 4:
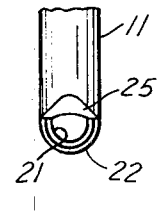
FIG. 4 is a front end elevation view of the extractor head as viewed in line with the longitudinal axis thereof.

Referring now to the drawings, in FIGS. 1–4 there is shown a tooth extracting instrument which comprises an elongated shank 11 having male external threads 12 at the rear end and having a handle 13 with internal threads threaded over the shank threads to demountably secure the handle to the rear end of the shank. The shank has a hexagonal nut 14 provided forwardly of the threaded end portion 12 to facilitate the tightening of the shank firmly to the handle. The handle 13 is preferably made of a hard plastic or metal and sized and shaped to afford a good grip by the user. The forward end of the shank has an extractor head generally designated 15. The extractor head 15 has a generally hollow semicircular cross section and includes an open, hollow or concave inner face 21, preferably of a semicircular shape, and a convex outer face 22 with the head being of a relatively thin uniform thickness and sized to slide between the wolf tooth and the second premolar tooth of a horse as described fully hereinafter. The extractor head terminates in a beveled forward cutting edge 23, also preferably of semicircular cross section, and formed by cutting a bevel or taper in the outer face.

The shank and extractor head are preferably constructed of a strong single piece of chrome alloy, stainless steel, or a comparable metal tubing of generally uniform thickness throughout, from which a segment is cut away along a generally U-shaped upper edge designated 25 which may be gradually tapered toward the front end as shown. With this material the extractor head may be bent to the angle of inclination relative to the shank.

Figure 5:
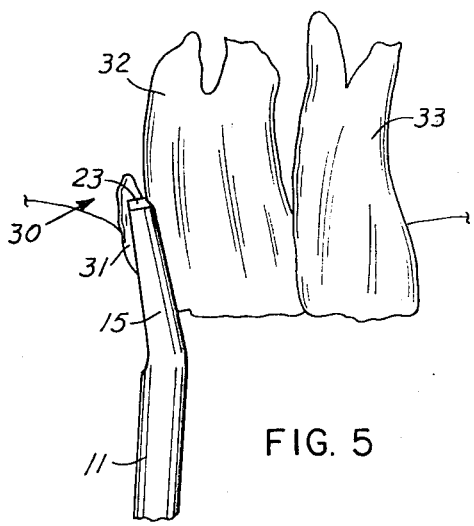
FIG. 5 is a generally schematic side elevation view illustrating the instrument shown in a first position with the inner face in engagement with a side of the wolf tooth and the outer face against an adjacent tooth.
Figure 6:
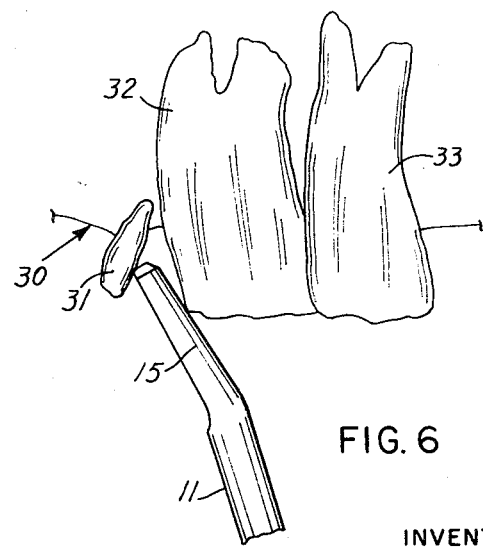
FIG. 6 is a generally schematic side elevational view illustrating a second position for the extractor head with the wolf tooth being pried from the upper jaw using the adjacent second premolar tooth as a base support for the prying action.

The operation of the above-described tooth extracting instrument will now be described with particular reference to FIGS. 5 and 6 wherein a portion of the jaw 30 of a horse is shown which includes wolf tooth 31, second premolar 32 adjacent the wolf tooth 31, and the third premolar 33 is also shown adjacent the second premolar. The instrument is grasped by the operator by the handle 13 and the extractor head 15 is moved vertically upwardly between the wolf tooth 31 and the second premolar 32 with the inner face embracing the side of the wolf tooth and the forward cutting edge biting into the root of the tooth, which is the first position for the extractor head. After the root is elevated and loosened by repeated upstrokes with the extractor head being moved along all sides of the tooth, the extractor head 15 is moved to an inclined position with the outer face 22 being forced against the second premolar to pry the wolf tooth from the upper jaw.

The hollow semicircular cross section of the cutting edge of the extractor is preferable to loosen the tooth in its upward thrush and has been found to eliminate the possibility of having the extractor head slip off the tooth when used to elevate the periosteum from the root of the tooth. The hollow semicircular cross section for the extractor head allows the complete root to be elevated with only two positions of the extractor, making is easy to manipulate and maneuver. The bevel ground on the outer face assists in keeping the cutting edge of the extractor head next to the tooth root. The inclination of the extractor head relative to the shank allows the cutting edge to bite into the root while the convex outer surface is used as a lever against the second premolar.

In a preferred embodiment shown the shank has an outside diameter of three-eighths inch or seven-sixteenths inch and the thickness of the shank and head may vary, for example, from 0.030 to 0.062 inch. The preferred angle of inclination for the extractor head relative to the shank which has been found to be particularly effective is about 15° but it is understood that the extractor head could be usable with an angular position anywhere from 0° to 45°.

Although the present invention has been described with a certain degree of particularity, it is understood that the present disclosure has been made by way of example and that changes in details of structure may be made without departing from the spirit thereof.

What is claimed is:

1. In a tooth extracting instrument including an elongated shank, the improvement comprising an extractor head at the front end of the shank having an open hollow inner face for slidable insertion about a side of the tooth and having a correspondingly shaped outer face, said extractor head terminating in a forward cutting edge whereby the root of the tooth is loosened and the tooth is removed in an upward stroke followed by an outward prying action against the side of the tooth.

2. A tooth extracting instrument as set forth in claim 1 wherein said extractor head is inclined at an angle relative to the longitudinal axis of the shank.

3. A tooth extracting instrument as set forth in claim 2 wherein said angle of inclination is about 15°.

4. A tooth extracting instrument as set forth in claim 1 wherein said shank and head are made from a single piece of hollow circular tubing of generally uniform thickness throughout and made of a material capable of resisting chipping and bending.

5. A tooth extracting instrument as set forth in claim 4 wherein said head is formed by removing an arcuate segment of the tubing at the forward end thereof and has a bevel along the outer face to form the forward cutting edge.

6. A tooth extracting instrument as set forth in claim 2 wherein the extractor and said inner and outer faces and said cutting edge are generally semispherical in shape.

7. A tooth extracting instrument as set forth in claim 1 wherein said shank is sufficiently long to extend below the jaw of a horse when the extractor head is in engagement with the tooth being removed.

8. A tooth extracting instrument as set forth in claim 1 wherein said extractor head terminates in a forward beveled surface in the outer face to form said cutting edge.

9. A tooth extracting instrument for removing the wolf tooth from the jaw of a horse comprising an elongated shank having a handle at the rear end and an extractor head inclined to the axis of the shank at the forward end, said extractor head having a generally concave inner face and a generally convex outer face and is sized in thickness for slidable insertion between the wolf tooth and an adjacent second premolar tooth, said extractor head terminating in a forward cutting edge, whereby the root of the wolf tooth is loosened as the head is moved vertically upwardly between said wolf tooth and second premolar tooth followed by a prying action of said outer face against the second premolar tooth to pry the first premolar from the upper jaw.

10. A tooth extracting instrument for removing the wolf tooth from a horse comprising an elongated shank made of a length of tubing having a handle detachably mounted on the rear end of the shank and an extractor head formed at the forward end thereof and inclined to the longitudinal axis thereof, said extractor head being of generally uniform thickness and having an open generally semicircular inner face and a generally semicircular outer face for slidable insertion about a side of a wolf tooth between the wolf tooth and an adjacent second premolar tooth, said extractor head terminating in a forward generally beveled cutting edge of semicircular cross section whereby the root of the wolf tooth is loosened as the extractor head is moved in an upward stroke followed by a prying action wherein the outer semicircular face being moved against the side of the second premolar to force said inner face against the root of the wolf tooth and extract the wolf tooth.

* * * * *